Figure 1:
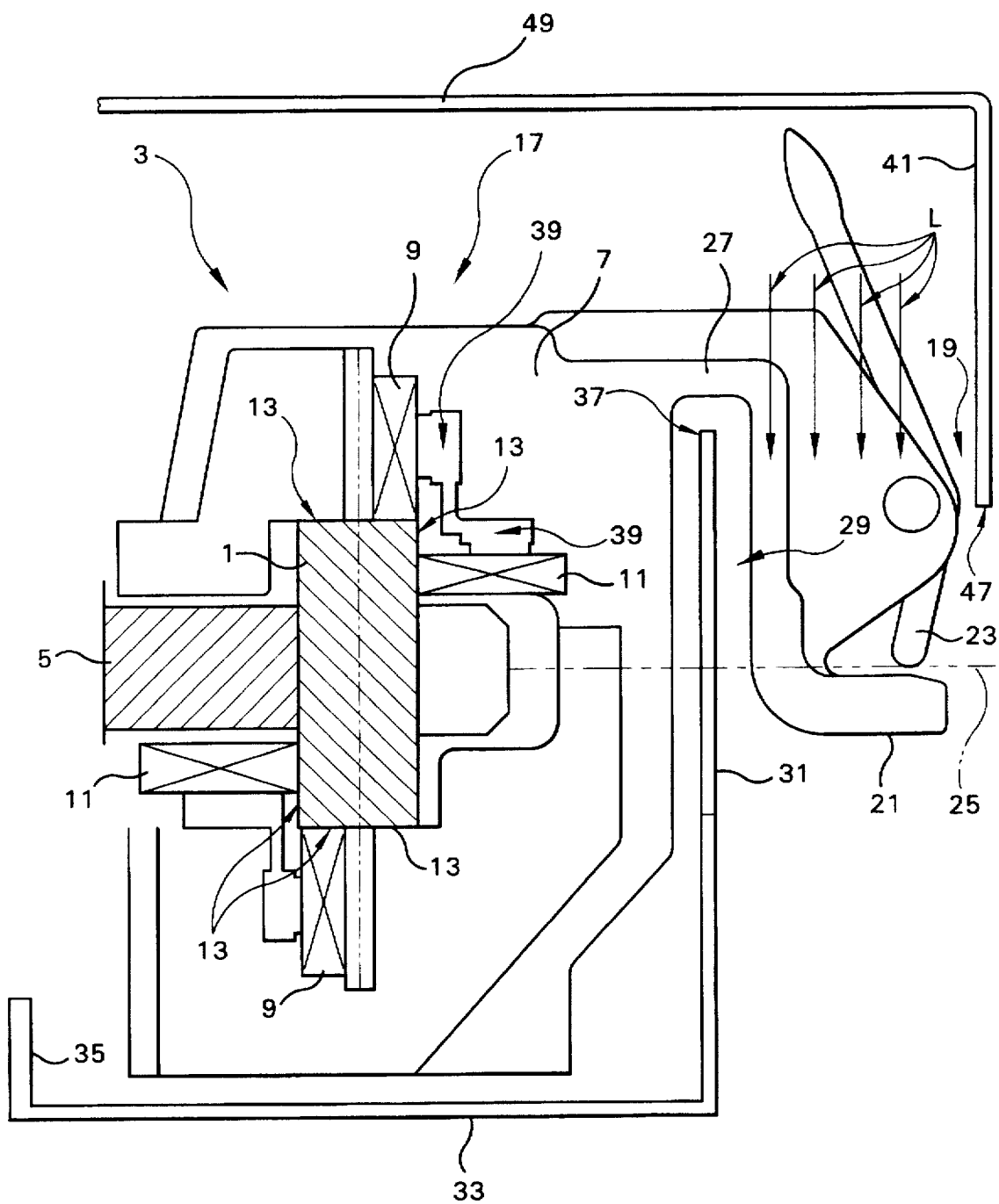

United States Patent [19]

Steffl

[11] Patent Number: 5,791,031
[45] Date of Patent: Aug. 11, 1998

[54] APPARATUS FOR PRODUCING LONGITUDINALLY AND/OR TRANSVERSELY DRAWN-OUT FILM WEBS, IN PARTICULAR FILM WEBS SIMULTANEOUSLY DRAWN OUT ALONG TWO AXES

[75] Inventor: Manfred Steffl, Grassau, Germany

[73] Assignee: Bruckner Maschinenbau GmbH, Siegsdorf, Germany

[21] Appl. No.: 793,869

[22] PCT Filed: Oct. 5, 1995

[86] PCT No.: PCT/EP95/03940

§ 371 Date: Mar. 11, 1997

§ 102(e) Date: Mar. 11, 1997

[87] PCT Pub. No.: WO96/11787

PCT Pub. Date: Apr. 25, 1996

[30] Foreign Application Priority Data

Oct. 13, 1994 [DE] Germany .......................... 44 36 676.0

[51] Int. Cl.[6] ..................................................... D06C 3/04
[52] U.S. Cl. ................................... 26/93; 26/89; 26/72
[58] Field of Search ............................. 26/89, 93, 94, 26/72, 73, 96

[56] References Cited

U.S. PATENT DOCUMENTS

| 3,469,291 | 9/1969 | Gageur | 26/93 |
| 3,500,515 | 3/1970 | Cunningham et al. | 26/61 |
| 3,580,451 | 5/1971 | Fraitzl | 26/93 |
| 3,748,704 | 7/1973 | Schmidt et al. | 26/93 |
| 4,435,884 | 3/1984 | Bosch | 26/93 |
| 5,081,750 | 1/1992 | Molz | 26/89 |
| 5,613,284 | 3/1997 | Hosmer | 26/89 |

FOREIGN PATENT DOCUMENTS

| 2 686 041 | 7/1993 | France . | |
| 2058575 | 5/1972 | Germany . | |
| 2749119 | 5/1979 | Germany | 26/93 |
| 28 41 510 | 6/1980 | Germany . | |
| 3131594 | 3/1983 | Germany . | |
| 3333938 | 4/1985 | Germany | 26/89 |
| 39 28 454 | 3/1991 | Germany . | |
| 60-106755 | 6/1985 | Japan . | |
| 178356 | 8/1986 | Japan | 26/89 |
| 61-124462 | 10/1986 | Japan . | |
| 62-240210 | 4/1988 | Japan . | |
| 971737 | 10/1964 | United Kingdom | 26/93 |

*Primary Examiner*—Amy B. Vanatta
*Attorney, Agent, or Firm*—Nixon & Vanderhye

[57] ABSTRACT

An improved device for producing longitudinally and/or transversely drawn-out foil webs, in particular foil webs simultaneously drawn-out along two axes, is characterized in that the actual clamping means that hold the edges of the foil are held and anchored, together with the nipper carriage that carries them, by means of an overlying bridge so as to leave a gap under the bridge in the cross view. A shielding wall projects upwards into the gap. The top edge of the wall ends above the plane of the foil web.

10 Claims, 1 Drawing Sheet

APPARATUS FOR PRODUCING LONGITUDINALLY AND/OR TRANSVERSELY DRAWN-OUT FILM WEBS, IN PARTICULAR FILM WEBS SIMULTANEOUSLY DRAWN OUT ALONG TWO AXES

The invention relates to an apparatus for producing longitudinally and/or transversely drawn-out film webs, in particular film webs simultaneously drawn out along two axes.

In the case of such apparatuses, it is known that nippers by which the edge of the film web to be drawn can be gripped, thereby advanced and drawn are made to travel along a rail arrangement. Longitudinal and transverse drawing installations and also biaxial drawing installations for simultaneously drawing film webs along two axes are known. In particular in the case of simultaneously biaxial drawing installations, as a rule the nippers or clamping means are connected to one another by links which are guided in zigzagged arrangement along two guide tracks in the stretching and fixing zone. The two guide tracks are laid in the longitudinal direction in the stretching zone with increasingly less distance between them and in the fixing zone with increasingly greater distance between them. As a result, the spacing between two nippers or nipper carriages changes, whereby the simultaneous biaxial drawing can be accomplished.

A nipper known from the prior art, which can be made to travel along a rail arrangement, is disclosed, for example, by DE 39 28 454 A1.

The apparatus comprises a rail of rectangular cross section transversely to its longitudinal direction. The nipper is equipped with upper and lower vertical running rollers and with horizontal running rollers which lie to the left and right of the rail and are offset in the longitudinal direction, by means of which rollers the nipper can be made to travel along on the rail, along the four running surfaces.

The nipper is made up of the nipper carriage, comprising the running rollers, and the associated clamping means for gripping and securing the edge of a film web to be drawn, for which purpose there is provided on the nipper carriage at approximately the height of the guide rail a nipper table on which, running in the plane of the film web, the edge of the film web is gripped and is tensioned and secured by a nipper lever, not shown in any more detail in the prior publication.

Although this is not represented in any more detail in DE 39 28 454, there may also be provided a shielding wall, which runs along the rail arrangement and shields the free region underneath the nipper carriage to underneath the nipper table.

Nippers which have nipper carriages and corresponding clamping means and are comparable in principle to this extent are also disclosed, for example, by DE 28 41 510 B1 or DE 20 58 575 A1.

The object of the present invention is to provide an apparatus for longitudinally and/or transversely drawing film webs or for simultaneously drawing film webs along two axes which is improved in comparison with the prior art, in particular is less susceptible to problems if the film tears, and in which the film web to be drawn is better protected against soiling.

It is known that the running carriages, the running rollers and the guide rail always has [sic] to be lubricated with appropriate lubricants, i.e. oils or greases. It has now been found that residues of such oils and lubricants are thrown in the direction of the film web, at least with particles and droplets of small size, thereby reducing the quality of the film web.

Conversely, however, it is also known that, when producing and drawing such film webs, it is always possible for a tearing of the film web to occur. Film remains and shreds are then accelerated in the direction of the nipper carriages by the drawing forces introduced into the film web via the nipper and may get onto the rail and consequently onto the running tracks themselves. In other words, the film remains in the nipper carriage may get caught up in the running rollers provided there, as a result of which, in the worst case, it is even necessary to stop the installation.

These disadvantages can be overcome according to the invention with comparatively simple means.

For this purpose, the nipper has a new design, which is distinguished in that the actual clamping means holding the edge of the film web are connected to the nipper carriage, which can be made to travel along the rail, by means of an overlying bridge construction. As a result, between the clamping means and the nipper carriage there is formed underneath the bridge a spatial distance, in which a lower shielding wall may be arranged. The upper edge of the shielding wall may in this case end much higher than the clamping plane, i.e. the position of the film web. It may consequently also lie much higher than the running surfaces on the rail.

As a result, a mutual shielding at the height of the rail arrangement and at the height of the film webs is ensured, preventing lubricants or residues of lubricants from being able to be thrown in the direction of the film web or, conversely, if there is a tear of the film web, pieces of film web and shreds of film web from being able to get into the region of the running rollers and the rail. This is so since, in the case of the design according to the invention, these film remains can only get as far as the shielding wall. This achieves the effect that the nippers are protected against any drawing in of film and that at the same time in turn and in particular the running rollers and the running tracks as well as the motors are protected against ingress of the film.

A further improvement can also be achieved in principle by there also being provided an upper shielding wall, which on the film web side covers the clamping means of the nipper from above toward the film web side. In other words, the upper covering wall ends at an appropriately adequate distance above the nipper table, or the film web. This produces a meandering covering, i.e. in side view parallel to the film web an overlapping covering, whereby the spatial separation between the film web and the nipper carriage arrangement is further improved. Consequently, even in unfavorable situations, residues of lubricants can no longer be thrown in the direction of the film web, but conversely, even in the case of a film web tear, pieces of film are completely shielded from the running rail and the nipper carriage arrangement and cannot get into this region.

The shielding as described according to the invention has particular advantages in drawing installations for the simultaneous biaxial drawing of films. This is so since, in the drawing zone, here the nipper spacing between two nippers becomes increasingly greater, with the consequence that, due to the increasing free space between two nipper carriages, without the shielding according to the invention there is an increasing risk that the rotation of the running rollers can cause residues of oil or lubricant to be thrown in the direction of the film web and contaminate it, and that conversely, if there is a tear of the film web, remains of film can get into the region of the rail and consequently of the nipper carriages and their running wheels.

Further advantages, details and features of the invention are explained in more detail below by means of an exemplary embodiment with reference to an attached drawing.

Shown in cross section in the drawing is a rail 1, sometimes also referred to in the following as a rail arrangement, which runs transversely to the plane of the drawing and along which the nipper 3 reproduced in cross-sectional representation in the figure can be made to travel.

In the exemplary embodiment shown, the rail 1 has a rectangular form and is held by means of a carrier 5 running to the left.

The nipper carriage itself has a U- to C-shaped basic structure, i.e. essentially a U-shaped frame 7, on which a plurality of vertical and horizontal running rollers 9 and 11, lying offset in the longitudinal direction of the nipper carriage, roll on the running tracks 13 formed by the upper and lower or left and right sides of the rail 1. The vertical running rollers 9 are provided with vertical bearings, running with their axis in the horizontal direction, and the horizontal running rollers 13 are provided with horizontal bearings, running with their axis in the vertical direction.

Instead of the running rollers mentioned, under certain circumstances other guide means may also be used to some extent, for example by using a sliding mounting.

It can be seen from the graphic representation that the nipper 3 is made up of a nipper carriage 17 (which essentially comprises the U-shaped carrying frame 7 with the vertical and horizontal running rollers 9, 11 etc. mentioned) and the clamping means 19, which in the exemplary embodiment shown comprises a nipper table 21 and a nipper lever 23, at the lower end of which the film web, running in the film web plane 25, can be gripped at its lateral edge and can be held clamped-in between the lower end of the nipper lever 23 and the nipper table 21. As can be seen from the graphic representation, the upper bearing surface of the nipper table 21, and consequently the film web plane 25, lies at least approximately halfway up the rail 1. This produces a comparatively tilt-free support of the nipper carriage on the rail 1. However, as a departure from this, other designs are also possible.

The connection between the clamping means 19 and the nipper carriage 17 takes place by means of an overlying bridge 27, forming underneath a spatial distance 29 between the clamping means 19 on the film web side and the nipper carriage 17 on the opposite side. In this spatial distance 29 there runs a shielding or shielding wall 31. At the lower end of the essentially vertically running shielding wall 31, said wall runs over into a bottom shielding wall 33 underneath the nipper carriage. In the exemplary embodiment shown, the shielding 31 is shaped in cross section in a form at least approaching that of a U and has on the side facing away from the film web also a shielding edge 35, extending over a small partial height. This shielding wall or trough thus formed runs parallel to the rail 1 running in its inner region.

The embodiment is such that the upper edge 37 of the shielding wall 31 lies above the film web, or the film web plane 25. At the same time, the upper edge 37 also lies above the horizontal or vertical running tracks 13 formed on the rail 1. In the exemplary embodiment shown, it is even ensured that not only the horizontal bearings of the horizontal running rollers 11, but in particular also the vertical bearings of the vertical upper running rollers 9 still come to lie below the upper edge 37 of the shielding wall 31. Only with a small partial height (which is less than the radius of the upper running rollers) do the upper vertical running rollers 9 still protrude in side view above the upper edge 37 of the shielding 31. However, even in the case of the exemplary embodiment shown, the bridge 27 between the clamping means 19 and the nipper carriage 17 may also be shaped in such a way that the upper edge 37 comes to lie relative to the maximum upper height to which the vertical running rollers 9 extend.

Since the running or rolling tracks 13 mentioned and the film web lie well below the upper edge 37 of the vertical shielding 31, optimum oil and lubricant shielding with respect to the film web is obtained. This effect is enhanced by the fact that all the horizontal and vertical bearings lie below the upper edge 37 of the shielding wall 31.

If in the exemplary embodiment shown the upper vertical running rollers 9 still lie above the upper edge 37 of the lower shielding wall 31, at least in a small region, here there may also be additionally provided so-called "integrated mudguards" 39, which also additionally cover the vertical running rollers 9 and their bearings in the direction of the film web side.

Conversely, however, protection against ingress of the film or of film web remains if the film web tears is also achieved in that the clamping location of the clamping means 19, and consequently the film web plane 25, lies well below the upper edge 37 of the lower shielding wall 31. If the film web tears, the film web remains can fall freely downward, without being able to get into the region of the nipper carriage or the running surfaces. The free fall downward is brought about by gravitational forces alone. If need be, assistance could also be provided here by means of an airflow directed from top to bottom (blower etc.), which is not specifically represented in any more detail in the drawing.

The shielding mentioned can be still further improved by also providing, as represented in the drawing, an upper shielding or shielding wall 41, which is arranged in the region above the rail 1 parallel thereto, i.e. following the latter, and above the nipper carriages 17 which can be made to travel along thereupon, and on the film web side runs with at least a vertical component toward the film web. Its lower edge 47 ends at an adequate distance above the film web plane 25 and consequently, in the transverse representation according to the attached drawing, on the side of the film web lying laterally next to the clamping means 19, i.e. in particular the nipper lever 23 and its mounting.

By this arrangement it is ensured that the lower edge 47 of the upper shielding 41 lies well below the upper edge 37 of the lower shielding 31. This produces in side view, i.e. with respect to the film web plane 25, an overlapping shielding with a meandering connecting path between the film space and the carriage arrangement. The mutual shielding effect of the film web from oils and lubricants and conversely the protection of the carriage arrangement, the running rollers and the running surfaces from film web remains and shreds is thereby still further enhanced and improved. In the exemplary embodiment shown, the upper shielding wall 41, running at least with a vertical component, goes over into a top walling 49, running away horizontally from the film web, above the nipper carriage and the clamping means 19.

As is represented in the drawing by means of the arrows L, an airstream directed from top to bottom could also be conducted downward between the upper and lower covering walls 41, 31 by a suitable way (for example by a blower etc.). In the case of a film web tear, it is ensured in this way that the pieces of film web and shreds of film web can be taken along downward with the airstream even more easily and even better, whereby the shielding effect with respect to the nippers and nipper carriages is still further improved.

The apparatus for producing longitudinally and/or transversely drawn-out film webs, in particular film webs simultaneously drawn out along two axes is thus distinguished according to the exemplary embodiment reproduced in the attached figure by the following features:

with a rail arrangement 1, along the rail arrangement 1, nippers 3 can be made to travel by means of nipper carriages 17, the respective nipper carriage can be made to travel by means of guide means 9, 11, which are differently directed and preferably comprise running rollers, along the running tracks 13 formed on the rail arrangement 1, the nipper carriages 17 and the rail arrangement 1 are designed in such a way that the guide means 9, 11 of the nipper carriages 17 engage at least partially over and/or around the rail arrangement 1, the clamping means 19 are held and anchored with the nipper carriage 17 carrying them by means of an overlying bridge 27, forming a spatial distance 29 underneath the bridge 27, in transverse view, into this spatial distance 29 there protrudes a lower shielding wall 41, running from bottom to top and lying offset with respect to the rail arrangement, the upper edge 37 of the lower shielding wall 31 ends at a distance above the film web plane 27 and the guide means 9, 11 of the nipper carriage 17 lie on the side of the shielding wall 31 opposite that of the clamping means 19, or of the shielding plane formed by the shielding wall 31.

I claim:

1. Apparatus for producing longitudinally and/or transversely drawn out film webs, comprising:

a rail including a plurality of running tracks;

at least one nipper carried by said rail for movement therealong and including a nipper carriage and a clamp for holding a film web defining a film web plane;

said nipper carriage carrying guides for bearing along respective running tracks on said rail;

said carriage including a bridge defining with portions of said carriage a downwardly opening gap below said bridge, said bridge being spaced above the film web plane;

a lower shielding wall extending upwardly into said gap and having an upper edge spaced below said bridge and above the film web plane; and said guides of the nipper carriage lying on a side of said shielding wall opposite said clamp.

2. Apparatus according to claim 1 wherein said running tracks formed on said rail lie below said upper edge of said lower shielding wall.

3. Apparatus according to claim 1 wherein said guides comprise generally horizontally disposed running rollers rotatable about generally vertical axes, said horizontally disposed rollers lying below said upper edge of said lower shielding wall.

4. Apparatus according to claim 1 wherein said guides comprise generally vertically disposed running rollers rotatable about generally horizontal axes and having bearings lying below said upper edge of said lower shielding wall.

5. Apparatus according to claim 4 wherein at least one vertical running roller bears against a running track along an upper side of said rail and is shielded by mud guards between said one vertical running roller and said lower shielding wall.

6. Apparatus according to claim 1 including an upper shielding wall extending downwardly toward said film web plane in spaced lateral relation to said clamp and said nipper carriage and terminating in a lower edge above said film web plane, said upper shielding wall lying on a side of said clamp opposite said lower shielding wall.

7. Apparatus according to claim 6 wherein said lower shielding wall and said upper shielding wall overlap one another.

8. Apparatus according to claim 6 wherein one of said running tracks lies along an upper side of said rail, said lower edge of said upper shielding wall terminating below said one running track.

9. Apparatus according to claim 7 wherein the height of overlap of said lower shielding wall and said upper shielding wall is at least 20% of the height of said rail.

10. Apparatus according to claim 6 wherein said upper shielding wall and said lower shielding wall define therebetween a downwardly directed air flow passage for preventing deposition of debris on said carriage.

* * * * *